(12) United States Patent
Chawla et al.

(10) Patent No.: US 11,880,338 B2
(45) Date of Patent: Jan. 23, 2024

(54) HARD LINK HANDLING WITH DIRECTORY SNAPSHOTS

(71) Applicant: EMC IP Holding Company LLC, Hopkinton, MA (US)

(72) Inventors: Rohit K. Chawla, Scotch Plains, NJ (US); Alexander S. Mathews, Morganville, NJ (US); Soumyadeep Sen, Summit, NJ (US); Marc A. De Souter, Wayne, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/382,496

(22) Filed: Jul. 22, 2021

(65) Prior Publication Data
US 2023/0028845 A1    Jan. 26, 2023

(51) Int. Cl.
*G06F 16/11* (2019.01)
*G06F 16/188* (2019.01)
*G06F 16/182* (2019.01)
*G06F 16/14* (2019.01)

(52) U.S. Cl.
CPC .......... *G06F 16/128* (2019.01); *G06F 16/148* (2019.01); *G06F 16/188* (2019.01); *G06F 16/1824* (2019.01)

(58) Field of Classification Search
CPC .. G06F 16/128; G06F 16/148; G06F 16/1824; G06F 16/188
See application file for complete search history.

(56) References Cited

U.S. PATENT DOCUMENTS

| | | |
|---|---|---|
| 7,873,619 B1 | 1/2011 | Faibiish et al. |
| 8,032,498 B1 | 10/2011 | Armangau et al. |
| 8,095,577 B1 | 1/2012 | Faibiish et al. |
| 8,412,688 B1 | 4/2013 | Armangau et al. |
| 8,661,068 B1 | 2/2014 | Seibel et al. |

(Continued)

FOREIGN PATENT DOCUMENTS

EP    3477482 A2    10/2018

OTHER PUBLICATIONS

Final Office Action issued by the U.S. Patent Office for U.S. Appl. No. 17/384,260 dated Apr. 27, 2023, 60 pages.

(Continued)

*Primary Examiner* — Mark D Featherstone
*Assistant Examiner* — Samuel C Sharpless, III
(74) *Attorney, Agent, or Firm* — Amin, Turocy & Watson, LLP

(57) ABSTRACT

Described is hard link handling when a directory snapshot exists that includes the hard link's connected file object. A hard link is created by allocating a virtual inode number for the hard link, with the virtual inode number mapped to a real inode number that identifies a real inode of the file object; the hard link is assigned weight. A total weight associated with the real inode is increased by the hard link weight, and a hard link data store is updated with an entry for the hard link. Upon receiving data write request to the hard link, weight data determines that the file object is shared as a result of the snapshot; the hard link is disassociated from the real inode file, and associated with a new real inode number and new real inode of a new file object. The data is written based on the new real inode.

21 Claims, 15 Drawing Sheets

(56) References Cited

U.S. PATENT DOCUMENTS

| | | |
|---|---|---|
| 8,938,425 B1 | 1/2015 | Armangau et al. |
| 8,943,282 B1 | 1/2015 | Armangau et al. |
| 8,996,490 B1 * | 3/2015 | Armangau ............. G06Q 30/02 |
| | | 709/201 |
| 9,135,123 B1 | 9/2015 | Armangau et al. |
| 10,282,099 B1 | 5/2019 | Kushwah et al. |
| 11,269,817 B2 | 3/2022 | Menezes et al. |
| 2014/0006454 A1 | 1/2014 | Danado et al. |
| 2019/0129621 A1 | 5/2019 | Kushwah et al. |
| 2019/0129810 A1 | 5/2019 | Kushwah et al. |
| 2019/0294586 A1 | 9/2019 | Kushwah et al. |
| 2020/0250049 A1 * | 8/2020 | Lee .................... G06F 11/1471 |

OTHER PUBLICATIONS

Fu et al., "Performance Optimization for Managing Massive Numbers of Small Files in Distributed File System", IEEE Transactions on Parallel and Distributed Systems, vol. 26, No. 12, Dec. 2015, 16 pages.

Non Final Office Action issued by the U.S. Patent Office for U.S. Appl. No. 17/384,260 dated Nov. 10, 2022, 51 pgs.

Notice of Allowance received for the U.S. Patent Office for U.S. Appl. No. 17/384,260 dated Nov. 1, 2023, 46 pages.

* cited by examiner

HARD LINK HANDLING WITH DIRECTORY SNAPSHOTS

BACKGROUND

A hard link in a filesystem allows access to the data of a single file object by two or more filenames, the hard link filename and the regular filename. Various data structures are used to map the hard link to the file object. In one UNIX-based implementation, one virtual inode number is used for the file object, another virtual inode number for the hard link, with both virtual inode numbers mapping to the same real inode number that identifies a real inode file of the file object.

In the context of directory snapshots, hard links are particularly complex. Consider a file object to which a hard link is established is in a directory that has been snapshotted. A write via the hard link cannot simply be performed to the file object, otherwise the snapshot view of the file object would be corrupted. The filesystem thus needs to properly handle data write operations in such a scenario.

BRIEF DESCRIPTION OF THE DRAWINGS

The technology described herein is illustrated by way of example and not limited in the accompanying figures in which like reference numerals indicate similar elements and in which.

DETAILED DESCRIPTION

The technology described herein is generally directed towards handling hard links in a filesystem when directory snapshots are available. In general, upon creation of a hard link, various data structures are updated in a way that facilitates support of a future data write operation to a hard link when a directory snapshot exists that includes the file object connected to the hard link. More particularly, the data structures are modified as described herein to disassociate the hard link from the snapshotted view of the file object, while retaining the hard link relationship in the non-snapshotted view of the file object.

It should be understood that any of the examples herein are non-limiting. As one example, the technology is described using a UNIX file system, in which virtual inodes map to real inodes to facilitate file sharing across different views of a real filesystem's files. However, the technology described herein can be applied to other data storages/filesystems. As such, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
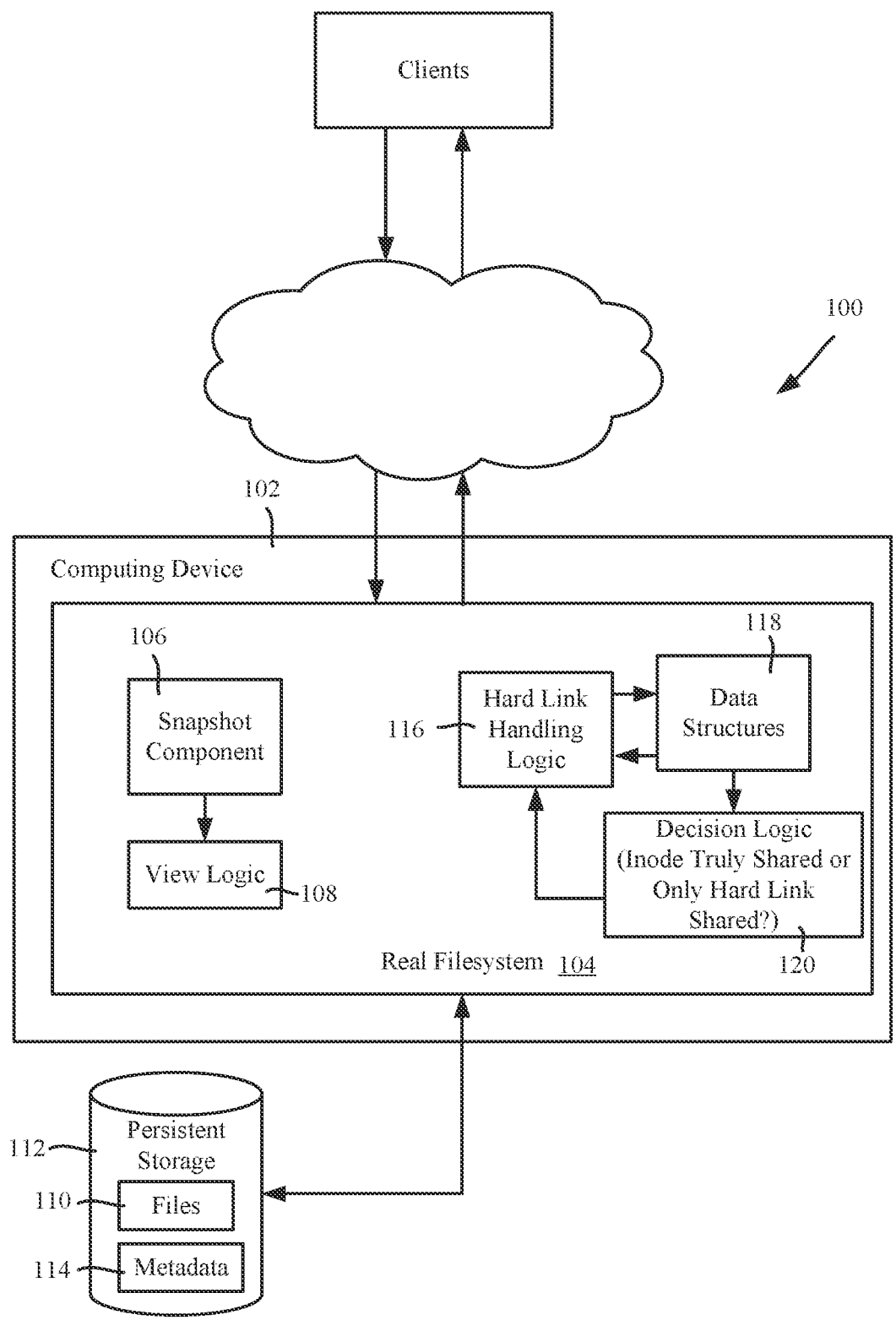
FIG. 1 is a block diagram representation of example components and data-related operations in a data storage system that facilitates directory snapshots (snaps) and hard links, in accordance with various aspects and implementations of the subject disclosure.

FIG. 1 shows a system 100 comprising a computing device 102 (which can be a group of devices such as an array of distributed computing nodes) that includes a real filesystem 104 as described herein. Typical such computing devices can comprise operating systems, drivers, network interfaces and so forth, however for purposes of brevity, only components generally relevant to snapshots, hard links and inode splitting are shown in FIG. 1.

In general and as described herein, the filesystem 104 supports a snapshot component 106, e.g., as a native filesystem component as shown, or alternatively as an external component coupled to the filesystem. When invoked, the snapshot component 106 produces a copy of the filesystem's snapshotted files as described herein, to provide different views of the real filesystem 104 as managed by view logic 108. In general files 110 in persistent storage 112 are shared by having different views' virtual inodes reference the same real inode (stored as metadata 114) for each snapshotted file.

View logic 108 separates the file system's real files into different virtual views of the real file system 104. For example, a first view of the filesystem namespace can access files A, B and C, a second view can access files B, D and F, and so on; file B is thus shared by at least the first view and the second view.

When an I/O operation to a file corresponding to a view is requested by a client (device), a filesystem identifier (ID) and a virtual inode number (VIN) for that view is specified in the file handle that is used to access the file. The VIN maps to a real inode referenced by a real inode number (RIN), by which the real file contents are accessed.

Hard link handling logic 116 handles the creation of a hard link via modification of various data structures 118 (generally corresponding to some of the metadata 114 and as described herein with reference to FIGS. 3-8), including a hard link data store (which can be a hard link database). A hard link comprises a virtual inode number (VIN) that maps to the real inode number of a real inode file of the file object accessible via the hard link. When a write operation to a hard link is received, and the real inode of the file object to which the hard link is coupled is determined (block 120) to be truly shared as a result of a directory snapshot, the hard link handling logic 114 splits the inode by allocating a new real inode for the file object to be modified by the write, and remapping the VINs (including the VIN of the hard link) of the non-snapshotted view to the new real inode. This preserves the inode file of the snapshotted view. Other data structures including the hard link data store are also updated as described herein to facilitate the data write operation.

Figure 2A:
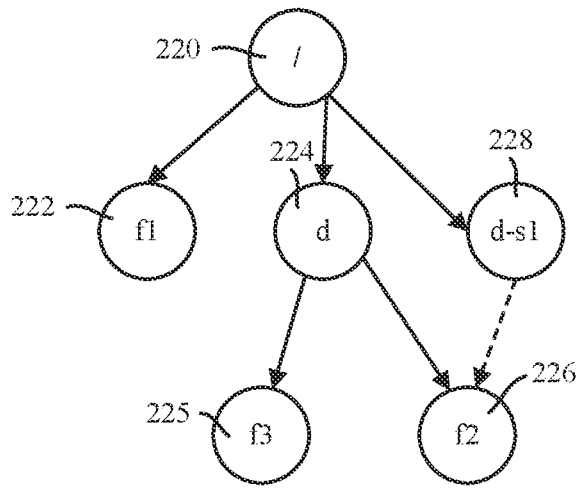
FIGS. 2A-2C are example representation of directories and files, including after a directory snap (FIG. 2A), creation of a hard link (FIG. 2B) and a write to the hard link (FIG. 2C), in accordance with various aspects and implementations of the subject disclosure.
Figure 2B:
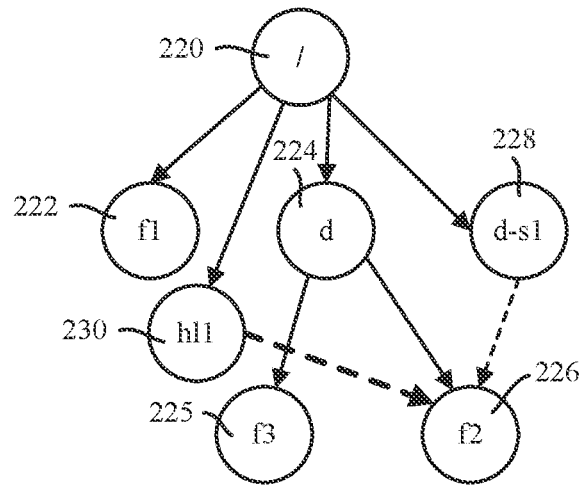
Figure 2C:
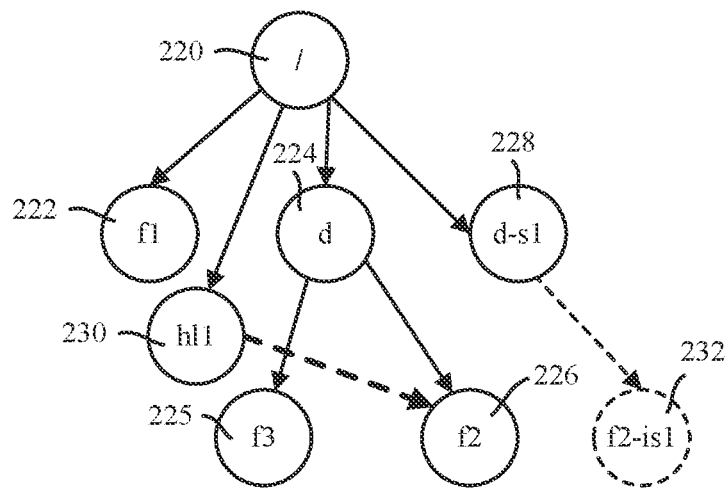

FIGS. 2A-2C generally show an example hierarchical structure of directories and files, including in a first state (FIG. 2A) that includes a snapshotted directory, a second, later state in which a hard link has been created (FIG. 2B), and a third state (after the second state) in which a write has been made to a file of the snapshotted directory (FIG. 2C). Note that the source from which the snapshot is taken provides for one view (e.g., a primary filesystem view) by which directories files can be accessed, while the snapshot corresponds to a different view, e.g., a snap view which can be considered another view, a snap filesystem view. A real filesystem underlies the views, and each view's directories and files are accessed by per-view virtual inode numbers (VINs) that map to the real inode numbers (RINs) of the real filesystem.

In FIG. 2A, a root directory 220, named "/" in this example, contains a file 222 named f1, and a subdirectory 224 named "d" that contains files "f3" 225 and "f2" 226. A snapshot, or simply "snap" has been created from the subdirectory "d" 224, whereby a snapshot subdirectory "d-s1" 228 also contains file f2. Note that the "f3" file 225 is not shown as part of the snapshot view subdirectory "d-s1" 228.

In general, a snap is created by having the virtual inode number (VIN) for the snap view map to the same real inode number (RIN) file that identifies the real inode file that references the file "f2" 226. In this way, the data of file "f2" 226 is shared by the source view (e.g., a primary filesystem view) and the snap view.

FIG. 2B represents a state in which a hard link 230 ("h11") is created, under root directory "/" 220, to the file "f2" 226. As is known, the hard link 230 provides a different pathname/filename to access the file "f2" 226; in this example the file "f2" 226 can be accessed under its original subdirectory "d" 224 path or under the root directory "/" 220 path (with possibly a different filename).

FIG. 2C represents a state in which a data write to the file "f2" 226 has occurred via the hard link 230. If the file is truly shared, (detected as described herein), the previously shared inode needs to be split as part of the write operation, otherwise the snap view would read the source view's changed data, which would be incorrect. Thus, the original inode is maintained for the snap view of the data (accessed via the snap view's VIN-to-RIN mapping), while a new real inode number and new real inode file are created (accessed via the source view's VIN-to-RIN mapping) for the updated file "f2" 226. Although the VIN, RIN and real inode associated with the snap view are not modified, the snap view subdirectory "d-s1" 228 contains the pre-written state of the file f2's data, shown as a file "f2-is1" 232 that contains the original data of the file f2 before the write.

In order to support hard link handling in the presence of directory snaps and write operations, various data structures as described with reference to FIGS. 3-8 are described herein. In general, the data structures of FIGS. 3 and 4 correspond to FIG. 2A, the data structures of FIGS. 5 and 6 correspond to FIG. 2B, and the data structures of FIGS. 7 and 8 correspond to FIG. 2C. As will be seen, the data structures 100 and 101 (numerically labeled by their RINs), and 301, 400 and 410 correspond to the root directory "/" 220; the data structures 103 and 104 (numerically labeled by their RINs), and 304, 403 and 413 correspond to the subdirectory "d" 224; and the data structures 106 and 107 (numerically labeled by their RINs), and 307, 407 and 417 correspond to the snap directory "d-s1" 228. Block 440 is a summary of the data structures having real inode numbers for the directory data structures, as well as the real inode numbers for the files f1, f2, f2-is1 (FIG. 8) and f3. Block 660 (FIGS. 6 and 8) show the entries for the file f2 in a hard link database that maintains information for hard links. It should be noted that some of the depicted data structures can be combined into a larger data structure or structures.

Figure 3:
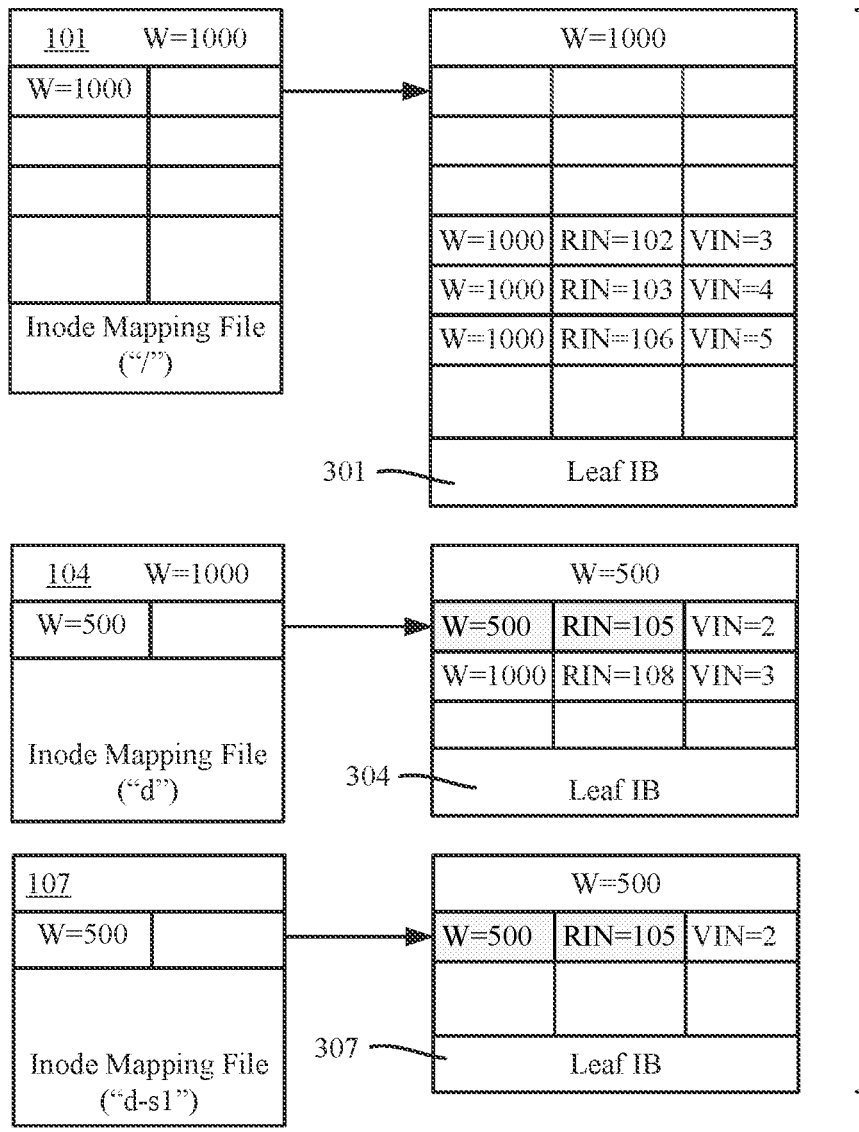
FIGS. 3 and 4 are representations of various data structures in a state corresponding to FIG. 2A, in accordance with various aspects and implementations of the subject disclosure.

In FIG. 3, data structures corresponding to inode mapping files with RINs 101 (for directory "/"), 104 (for directory "d") and 107 (for snap directory "d-s1"), in conjunction respective leaf indirect blocks 301, 304 and 307, correlate the real inode numbers 101, 104 and 107 to the VINs and RINs of each directory's direct children. Thus, it is seen that in this example corresponding to the state depicted in FIG. 2A, inode mapping file 101 points to the leaf indirect block 301, which associates file f1's RIN 102 with VIN 3, directory d's RIN 103 with VIN 4, and snap directory d-s1's RIN 106 with VIN 5. The inode mapping file 104 points to the leaf indirect block 304, which associates file f2's RIN 105 with VIN 2 and file f3's RIN 108 with VIN 3. The inode mapping file 107 points to the leaf indirect block 307, which associates file f2's RIN 105 with VIN 2.

Given any VIN, such as provided as part of a file handle for a read operation, the mapping tables are used to locate the RIN, and thereby locate the real inode file to access the file's data. For example, via VIN 2, both directory "d" 224 and its snap directory d-s1 are mapped to RIN 105, which corresponds to the real inode file by which f2's data is accessible. The file f2 is thus shared among the first view and the second (snap) view in the state shown in FIG. 2A. A read operation from either view will return the same data.

Figure 4:
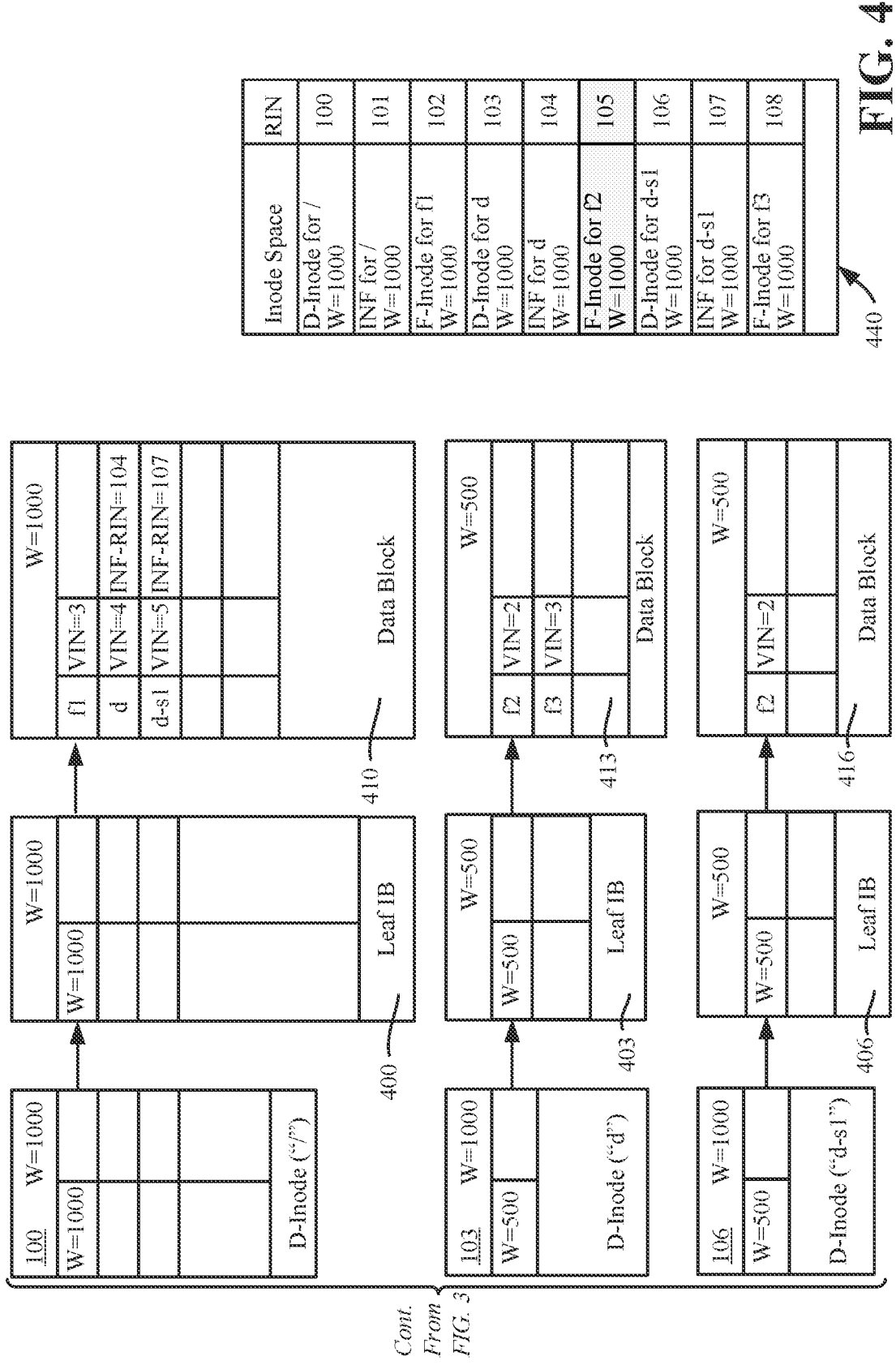

The real inodes 100 (for directory "/"), 103 (for directory "d") and 106 (for snap directory "d-s1"—which is a snap of directory "d") and associated block chains while in the state corresponding to FIG. 2A are shown in FIG. 4. In data block 410, "INF-RIN" shows that the inode mapping file for directory "d" has the real inode with a RIN of 104 (FIG. 3), and that the inode mapping file for directory "d-s1" has the real inode with a RIN of 107 (FIG. 3).

FIG. 4 also shows the summary inode file space in block 440, in which each RIN 100-108 represents a real inode file for a directory (D-Inode), a real inode file for a mapping table/file, or a real inode file for a file object. Each real inode file has a total weight as described herein. Note that the file "f2" is shared between directory "d" and its snap "d-s1;" accordingly the weight (=500) for RIN 105 in the leaf indirect block 304 and the weight (=500) for RIN 105 in the leaf indirect block 307 of FIG. 3 (of 500) sum to the total weight (=1000) in f2's real inode file (RIN 105) as summarized in block 440 of FIG. 4. These weights and RINs of 105 are shown lightly shaded in FIGS. 3 and 4 for emphasis.

Figure 5:
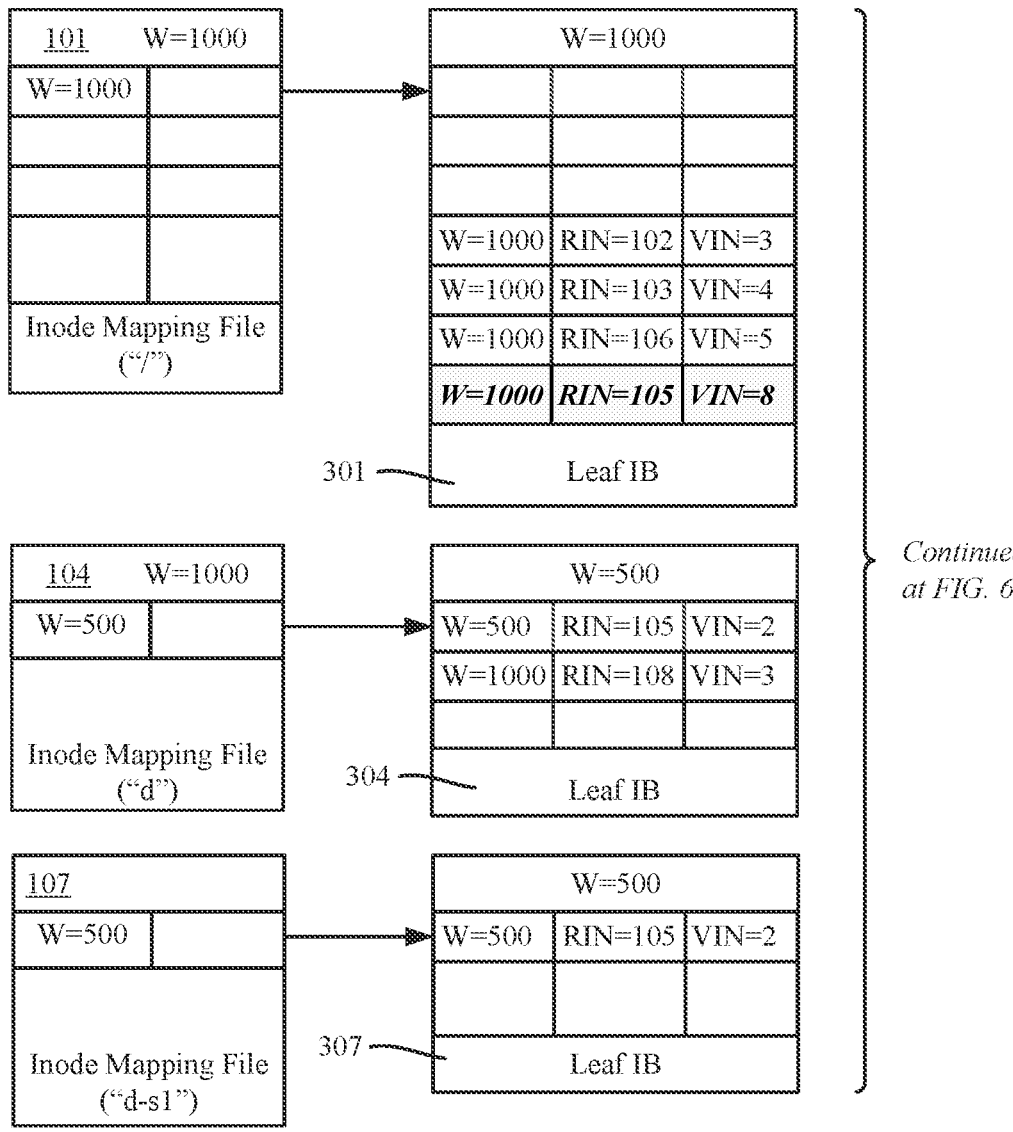
FIGS. 5 and 6 are representations of various data structures in a state corresponding to FIG. 2B, in accordance with various aspects and implementations of the subject disclosure.
Figure 6:
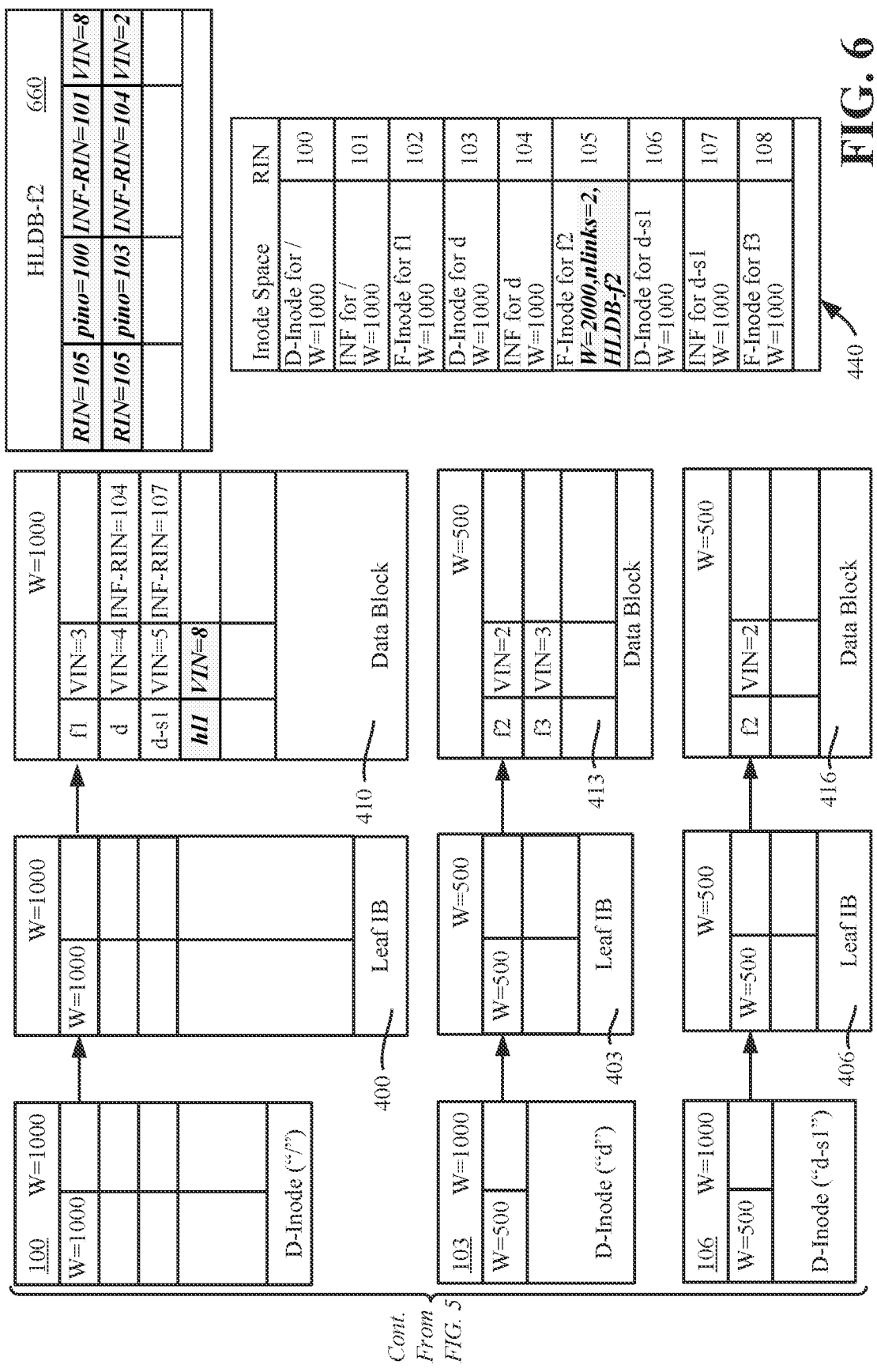

FIGS. 5 and 6 correspond to the state depicted in FIG. 2B, namely after a hard link ("h11") to file f2 is created in the "/" directory 220; (changes to the data structures relative to FIGS. 3 and 4 are shown bolded, italicized and shaded). As part of the creation, as shown in FIG. 5, a new VIN of 8 is allocated h11 in the leaf block 301. VIN 1 also maps to the real inode 105 for the file f2, and is initialized with a weight of 1000. A directory entry for h11 is added in the "/" directory as shown in data block 410 of FIG. 6.

A database entry 660 (FIG. 6) is added to a hard link database for the hard link to the file f2. A first part of the database entry contains the RIN (105) of the file f2, the parent inode file (pino=100) of the "I" directory (its inode file number) in which the hard link h11 is contained, the mapping file's real inode number of the "I" directory (=101), and the hard link's VIN of 8. A second part of the database entry contains the RIN (105) of the file f2, the parent inode file (pino=103) of the "d" subdirectory (its inode file number) in which the file f2 is contained, the mapping file's real inode number (=104) of the "d" subdirectory, and the file f2's VIN of 105.

As shown in the inode space 440, the total weight for the RIN of 105 is increased (to 2000) based on the hard link weight. Further, a link count indicates the current number of links (nlinks=2) by which the file can be accessed via the first view, and a reference to the database entry 660 for f2 in the hard link data store (e.g., database), shown as HLDB-f2.

Figure 7:
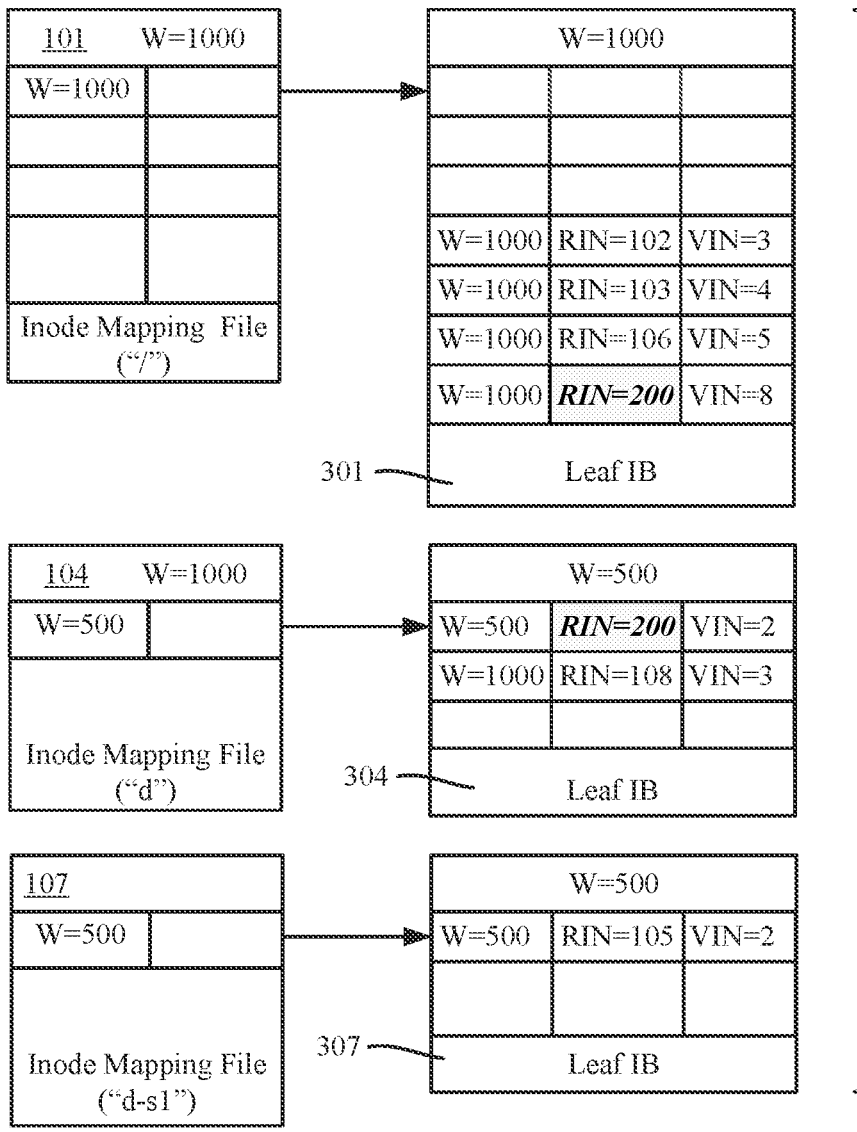
FIGS. 7 and 8 are representations of various data structures in a state corresponding to FIG. 2C, in accordance with various aspects and implementations of the subject disclosure.
Figure 8:
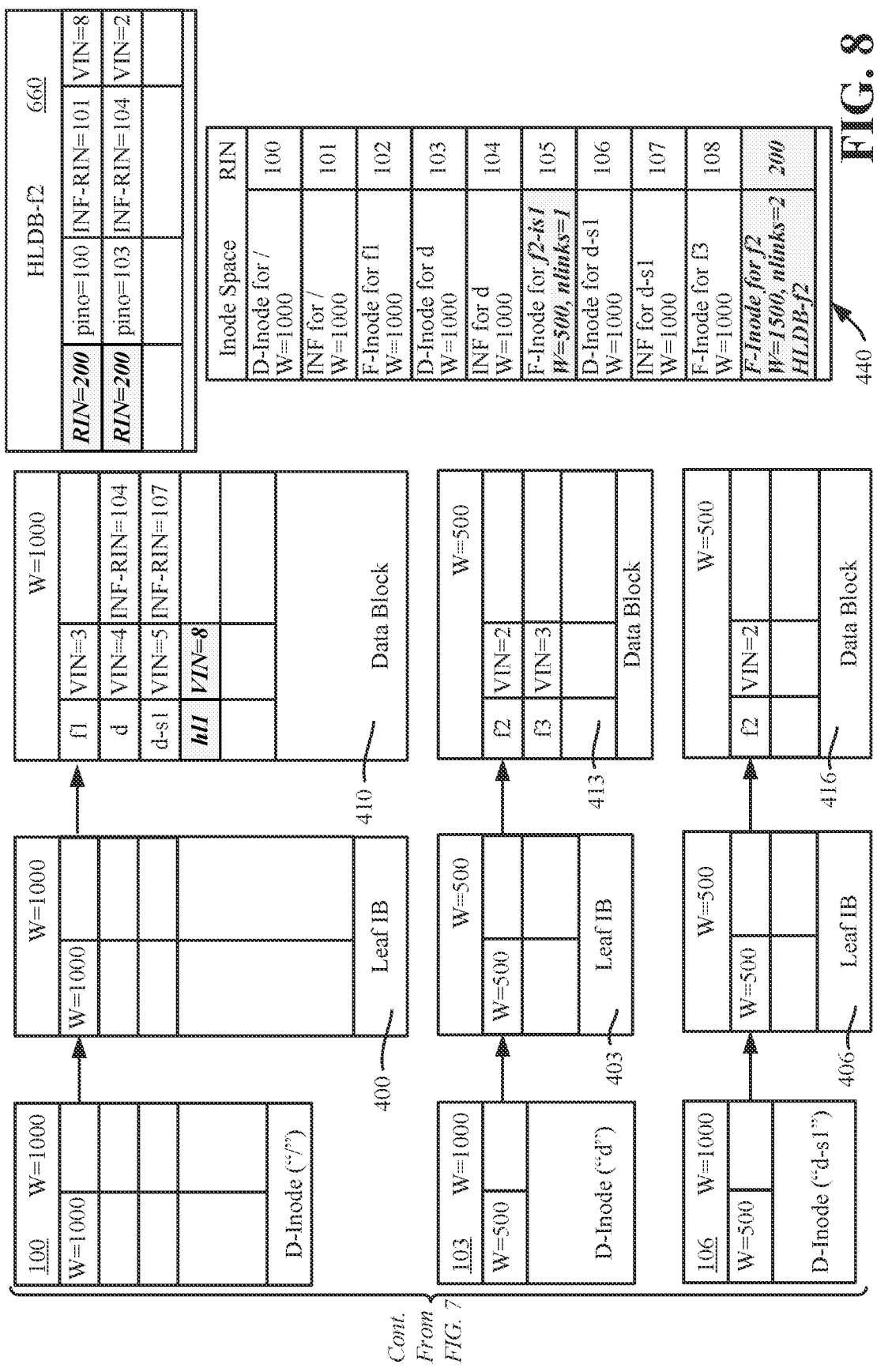

FIGS. 7 and 8 correspond to the state depicted in FIG. 2C, namely after a write to the file f2 via the hard link ("h11") is handled; (changes to the data structures relative to FIGS. 5 and 6 are shown bolded, italicized and shaded). As set forth above, because of the directory snap, a write to the file f2 via the hard link needs a split operation, so that the snap view continues to "see" the same, original data of f2 rather than the modified data as changed by the write.

If there is only hard link sharing of a file, then the system need not perform the split operation. However, if there is a file sharing as a result of a snap, then the system needs to preserve the file's original content for the snap view, and perform the split operation.

One way to identify if the sharing is only from a hard link or includes sharing as a result of a snap is to add the weights from the hard links and compare the summed result with the total weight. If the sum of the hard links' weights equal the total weight, then sharing is only via hard links. If not equal, then there is at least one snap weight missing, meaning that there is at least one snap and a split operation is needed.

In this example, to determine whether the file f2 is truly shared, the system operates by tallying the weights from the VIN-to-RIN entries listed in the HLDB for the f2 file, (which in this example is 1500) and compare the summed weight with the total weight in the f2 inode (which in this example is 2000). The inequality indicates true sharing as a result of a snap, which means that a split operation is needed.

Because in this example the file is truly shared as a result of a snap, a new RIN (=200 in this example) is allocated as shown in leaf indirect blocks 301 and 304 of FIG. 7, and in RIN of 200 in the inode space 440 in FIG. 8. Note that this decouples VIN 2 from RIN 105 in the first view, with RIN 105 remaining the same for the snap view. Existing version technology splits the weights of the mapping pointers (not shown).

Further, as shown in FIG. 8, the HLDB entry 660 for HLDB-f2 are updated with the newly allocated RIN of 200. The weights in the new RIN (200) for f2 are updated based on the VIN-to-RIN mappings using the list from the HLDB-f2.

In the inode space, the weight in the old f2 inode (RIN=105) is updated, as is the weight in the inode for the new RIN f 200. The number of links is reduced (to one) in the inode for the original 105 RIN, and the reference to the HLDB entry 660 for HLDB-f2 is removed, which disassociates the hard link from the snap version of the file "f2-is1" as shown in FIG. 2C as file 232

Figure 9:
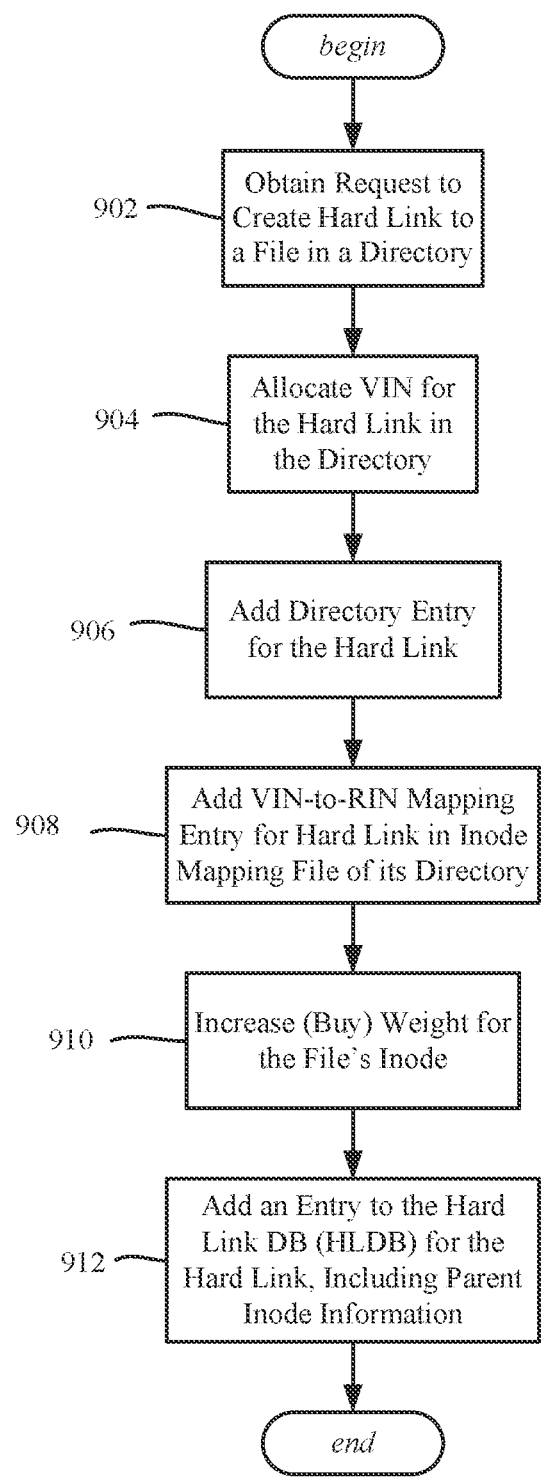
FIG. 9 is a flow diagram showing example operations related to creating a hard link to a file object, in accordance with various aspects and implementations of the subject disclosure.

FIG. 9 summarizes the operations for a hard link being created for a file, following a directory snap that includes that file in the snap view. Operation 902 represents obtaining the request to create hard link to the file in a directory.

To handle the request, operation 904 allocates a VIN for the hard link in the directory, and operation 906 adds a directory entry for the hard link. Operation 908 represents adding a VIN-to-RIN mapping entry for the hard link in the inode mapping file of the directory.

Operation 910 increases the weight (sometimes referred to as "buys" weight) in the file's inode based on the weight of the hard link. Operation 912 adds an entry to the hard link database (HLDB) for the hard link from the HLDB mappings, which includes information for the file's parent inode and the hard link's parent inode.

Figure 10:
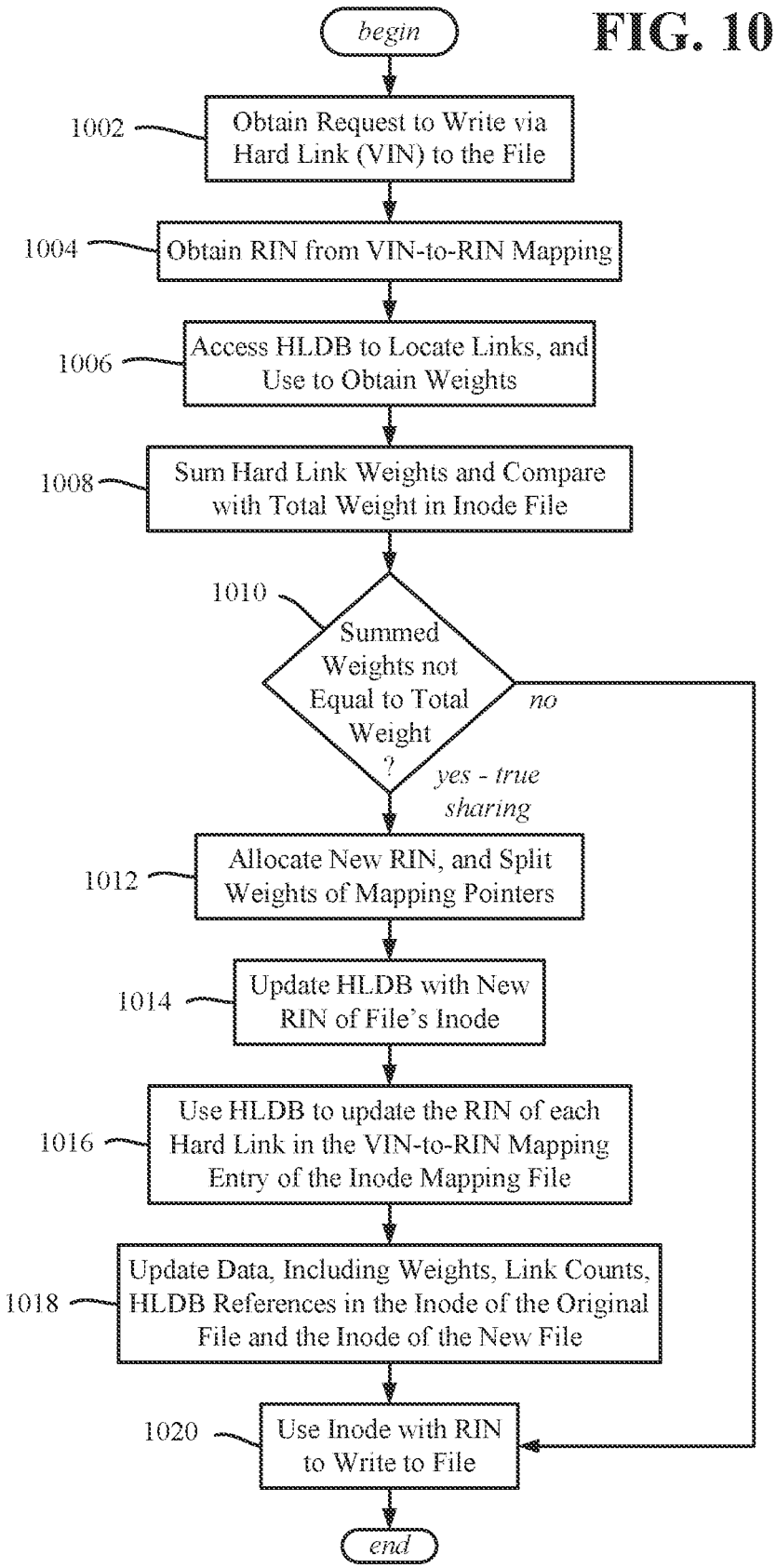
FIG. 10 is a flow diagram showing example operations related to handling a data write operation via a hard link to a file object that has been snapped, in accordance with various aspects and implementations of the subject disclosure.

FIG. 10 summarizes the operations for write to the file object via the hard link, as requested via the hard links VIN at operation 1002, which implies that the file data to which the hard link connects is to be updated. Operation 1004 obtains, via the mappings, the RIN of the inode file corresponding to the file object.

Operation 1006 accesses the HLDB to locate the links, and uses the links to obtain the hard link weight(s) and the file's weight for its parent directory. Operation 1008 sums the weights, and compares the result with the total weight in the inode file.

If the weights are equal as evaluated at operation 1010, then there is not true sharing, only hard link sharing, and operation 1010 branches to operation 1020 to write to the file object via the RIN. If instead the weights are unequal, then there is true sharing as a result of a snap, and a split operation is needed, including a new RIN, real inode file, and various data structure updates.

For a split operation, operation 1012 allocates a new RIN, and using existing version technology splits the weights of the mapping pointers. Operation 1014 updates the hard link database (HLDB) with the newly allocated RIN, and operation 1016, based on the list from the HLDB, updates the weights of each hard link in the VIN-to-RIN mapping entry of the inode file.

Operation 1018 represents updating the original inode data and the new inode data, e.g., the weights, link counts and HLDB references in their respective inode files. Operation 1020 then represents performing the write using the new real inode number following the split.

Figure 11:
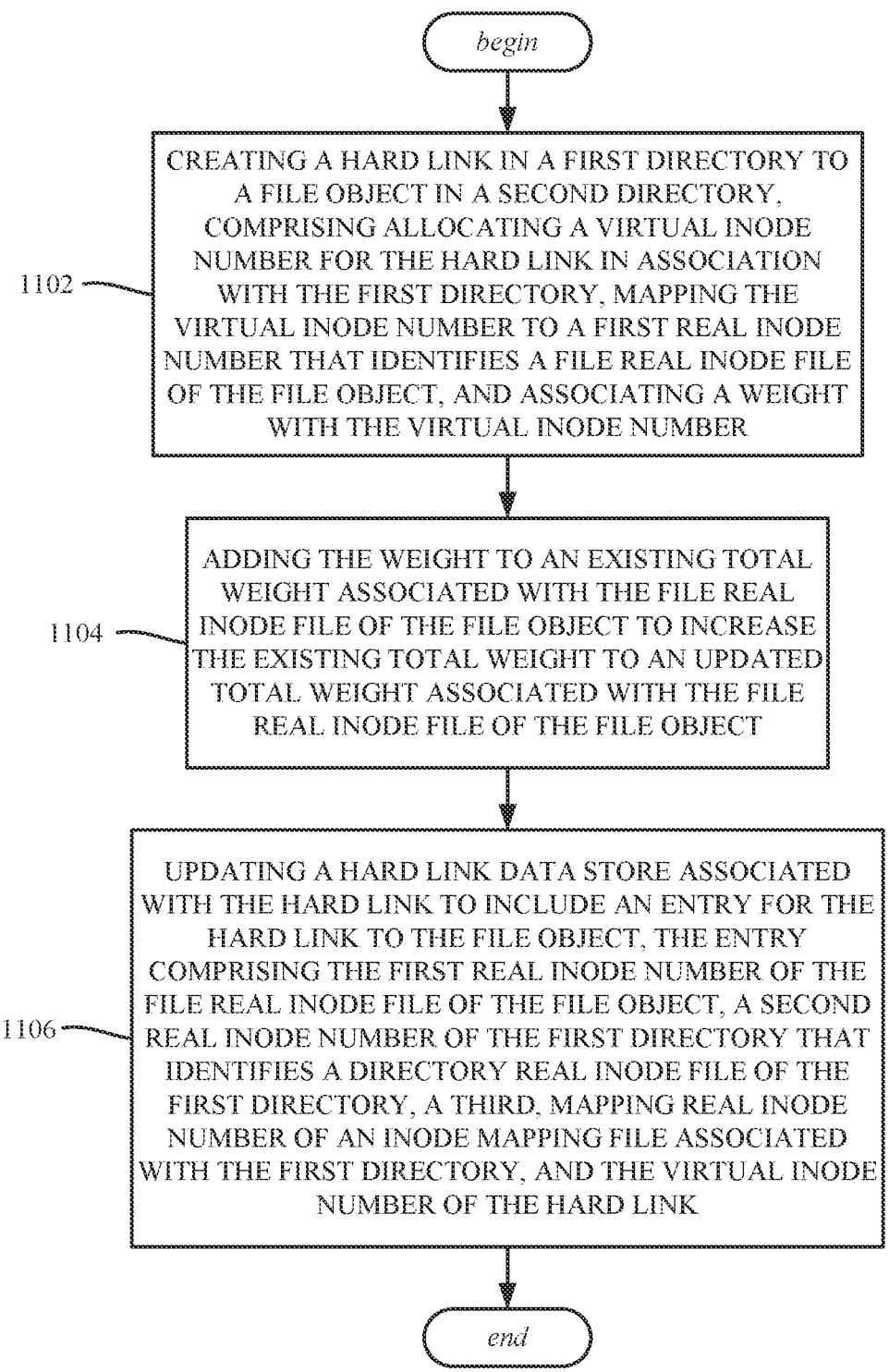
FIG. 11 is a flow diagram showing example operations related to creating a hard link and updating data structures to facilitate directory snapshots, in accordance with various aspects and implementations of the subject disclosure.

One or more aspects can be embodied in a system, such as represented in FIG. 11, and for example can comprise a memory that stores computer executable components and/or operations, and a processor that executes computer executable components and/or operations stored in the memory. Example operations can comprise operation 1102, which represents creating a hard link in a first directory to a file object in a second directory, comprising allocating a virtual inode number for the hard link in association with the first directory, mapping the virtual inode number to a first real inode number that identifies a file real inode file of the file object, and associating a weight with the virtual inode number. Operation 1104 represents adding the weight to an existing total weight associated with the file real inode file of the file object to increase the existing total weight to an updated total weight associated with the file real inode file of the file object. Operation 1106 represents updating a hard link data store associated with the hard link to include an entry for the hard link to the file object, the entry comprising the first real inode number of the file real inode file of the file object, a second real inode number of the first directory that identifies a directory real inode file of the first directory, a third, mapping real inode number of an inode mapping file associated with the first directory, and the virtual inode number of the hard link.

Creating the hard link in the first directory can comprise maintaining an identifier of the hard link and the virtual inode number of the hard link in a data block associated with the directory real inode file of the first directory.

Further operations can comprise maintaining an identifier of the hard link data store in association with the file real inode file of the file object.

The entry can be a first entry, the directory real inode file can be a first directory real inode file, the inode mapping file can be a first inode mapping file, the mapping real inode number can be first mapping real inode number, and further operations can comprise updating the hard link data store associated with the file object to include a second entry for the file object.

Further operations can comprise maintaining a link count representing a number of connections to the file object from a view by which the file object is accessible, the link count comprising one value for the hard link and one value for the second directory.

Mapping the virtual inode number to the first real inode number that identifies the file real inode file of the file object can comprise maintaining the first real inode number that identifies the file real inode file of the file object in a leaf indirect block associated with the directory real inode file of the first directory.

Further operations can comprise obtaining a request to write data via the hard link, and in response to the request, determining whether the file real inode file is shared as a result of a snapshot, and in response to determining that the file real inode file is not shared as a result of a snapshot, writing the data to the file object. Determining whether the file real inode file is shared as a result of a snapshot can comprise accessing the hard link data store to locate data structures containing weights corresponding to the entries in the hard link data store, summing the weights to a summed weight, evaluating the summed weight and the updated total weight associated with the file real inode file of the file object, and in response to the summed weight being determined to equal the updated total weight, determining that the file real inode file is not shared as a result of a snapshot.

The file object can be a first file object, and further operations can comprise obtaining a request to write data via the hard link, and in response to the request, determining whether the file real inode file is shared as a result of a snapshot that associates the first file object with a third directory, and in response to determining that the file real inode file is shared as a result of the snapshot, allocating a fourth file real inode number of a new file real inode file of a second file object for the hard link, associating the virtual inode number of the hard link with the fourth file real inode number to disassociate the hard link from the file real inode file of the first file object, updating the hard link data store entries to include the fourth real inode number, copying the file real inode file of the first file object to the new file real inode for the hard link, reducing a first weight in the file real inode file of the first file object by a reduced amount, updating a second weight in the new file inode file for the hard link based on the reduced amount, and writing the data to the new file object based on the new file real inode file. Determining whether the file real inode file is shared as a result of the snapshot can comprise accessing the hard link data store to locate data structures containing weights corresponding to the entries in the hard link data store, summing the weights to a summed weight, evaluating the summed weight and the updated total weight associated with the file real inode file of the first file object, and in response to the summed weight being determined not to equal the updated total weight, determining that the file real inode file is shared as a result of the snapshot.

Figure 12:
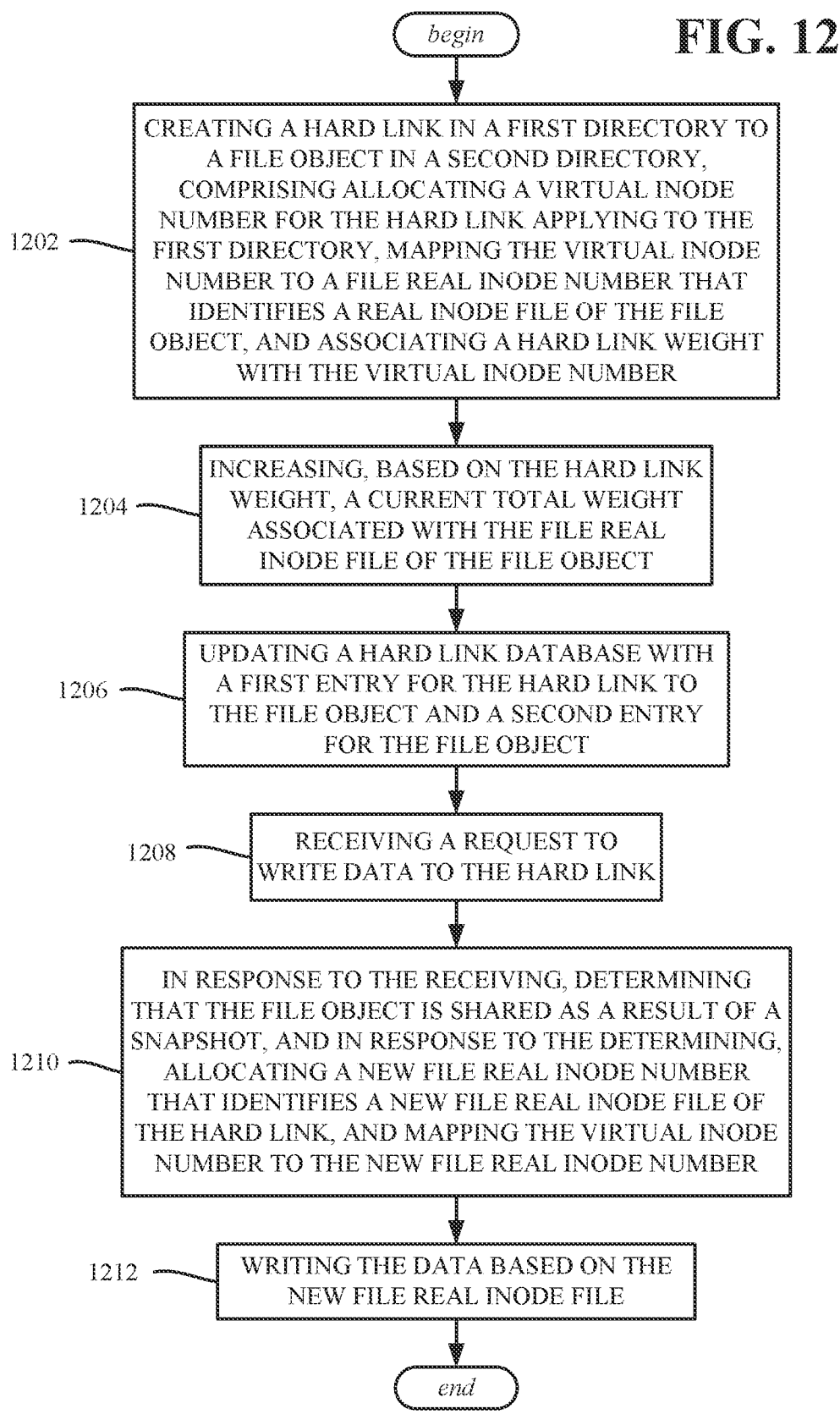
FIG. 12 is a flow diagram showing example operations related to creating a hard link and handling a write operation via the hard link to a snapshotted file object, in accordance with various aspects and implementations of the subject disclosure.

One or more aspects can be embodied in a system, such as represented in FIG. 12, and for example can comprise a memory that stores computer executable components and/or operations, and a processor that executes computer executable components and/or operations stored in the memory. Example operations can comprise operation 1202, which represents creating a hard link in a first directory to a file object in a second directory, comprising allocating a virtual inode number for the hard link applying to the first directory, mapping the virtual inode number to a file real inode number that identifies a real inode file of the file object, and associating a hard link weight with the virtual inode number. Operation 1204 represents increasing, based on the hard link weight, a current total weight associated with the file real inode file of the file object. Operation 1206 represents updating a hard link database with a first entry for the hard link to the file object and a second entry for the file object. Operation 1208 represents receiving a request to write data to the hard link. Operation 1210 represents, in response to the receiving, determining that the file object is shared as a result of a snapshot, and in response to the determining, allocating a new file real inode number that identifies a new file real inode file of the hard link, and mapping the virtual inode number to the new file real inode number. Operation 1212 represents writing the data based on the new file real inode file.

Mapping the virtual inode number to the new file real inode number decouples the hard link from the real file inode file of the file object, and further operations can comprise updating the weight in the file real inode file of the file object based on the hard link weight.

Determining that the file real inode file is shared as a result of the snapshot can comprise accessing the hard link database to locate data structures containing weights corresponding to the entries in the hard link database, summing the weights to a summed weight, and determining that the summed weight does not equal the current total weight associated with the file real inode file of the file object.

Further operations can comprise associating, prior to receiving the request to write the data to the hard link, an identifier of the hard link database with the file real inode file of the file object, and, after receiving the request to write the data to the hard link, and in response to the determining that the file object is shared as a result of a snapshot, disassociating the identifier of the hard link database from the file real inode file of the file object. Further operations can comprise maintaining a link count representing a number of connections to the file object.

Figure 13:
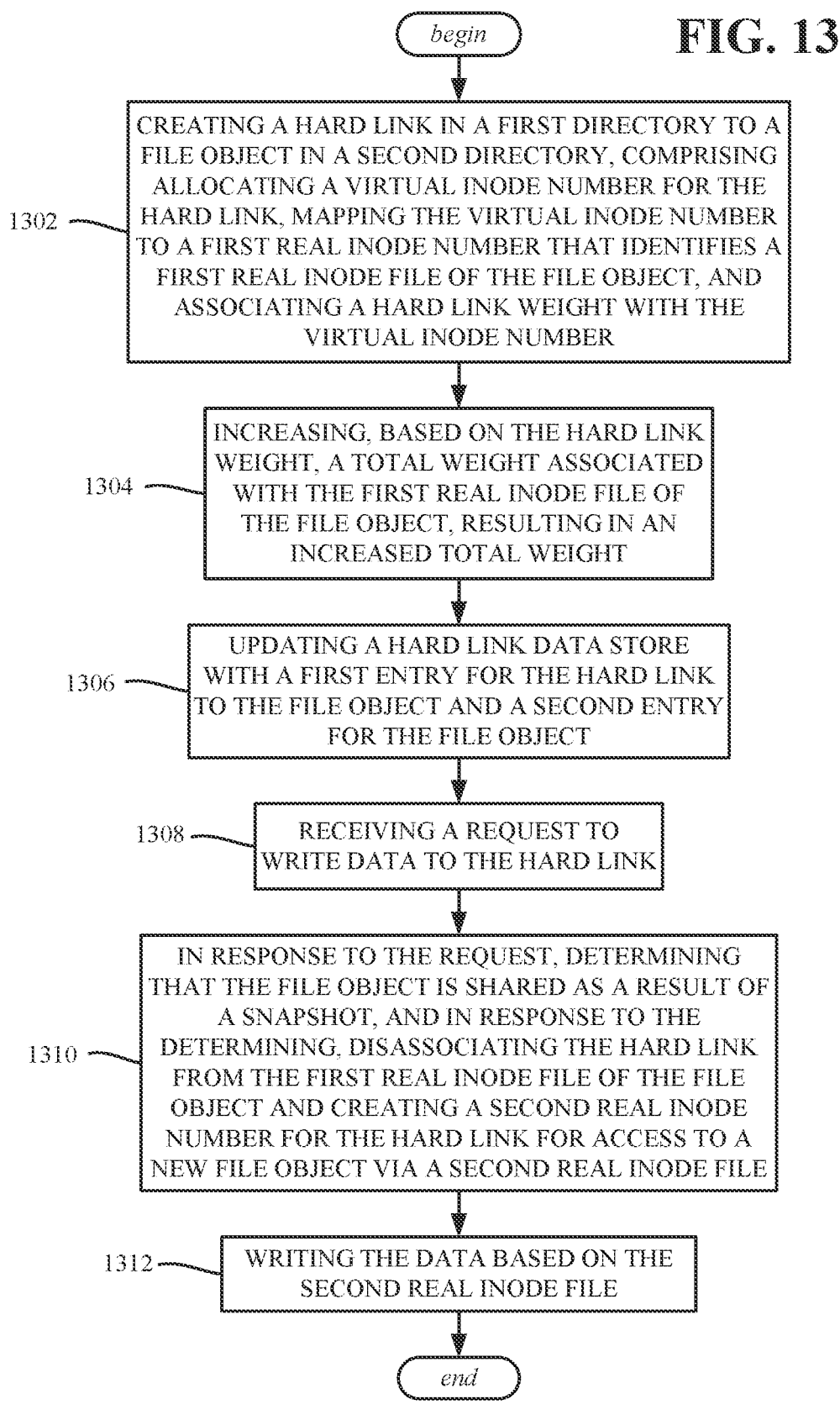
FIG. 13 is a flow diagram showing example operations related to creating a hard link and handling a write operation via the hard link to a file object disassociated from the snapshotted filed object, in accordance with various aspects and implementations of the subject disclosure.

FIG. 13 summarize various example operations, e.g., corresponding to a machine-readable storage medium, comprising executable instructions that, when executed by a processor, facilitate performance of operations. Operation 1302 represents creating a hard link in a first directory to a file object in a second directory, comprising allocating a virtual inode number for the hard link, mapping the virtual inode number to a first real inode number that identifies a first real inode file of the file object, and associating a hard link weight with the virtual inode number. Operation 1304 represents increasing, based on the hard link weight, a total weight associated with the first real inode file of the file object, resulting in an increased total weight. Operation 1306 represents updating a hard link data store with a first entry for the hard link to the file object and a second entry for the file object. Operation 1308 represents receiving a request to write data to the hard link. Operation 1310 represents, in response to the request, determining that the file object is shared as a result of a snapshot, and in response to the determining, disassociating the hard link from the first real inode file of the file object and creating a second real inode number for the hard link for access to a new file object via a second real inode file. Operation 1312 represents writing the data based on the second real inode file.

Disassociating the hard link from the first real inode file of the file object can comprise allocating the second real inode number that identifies the second real inode file of the hard link, and mapping the virtual inode number of the hard link to the second real inode number.

Disassociating the hard link from the first real inode file of the file object can comprise reducing the increased total weight in the first real inode file of the file object to the total weight based on the hard link weight.

Determining that the first real inode file is shared as a result of the snapshot can comprise accessing the hard link data store to locate data structures containing weights corresponding to the entries in the hard link data store, summing the weights to a summed weight, and determining that the summed weight does not equal the increased total weight associated with the first real inode file of the file object.

Further operations can comprise maintaining, in the second real inode file, a link count representing a number of connections to the new file object.

As can be seen, described herein is a technology that handles hard links in the presence of a directory snapshot. A write to the hard link results in an inode split operation to preserve the snapshot's view of the file object.

Figure 14:
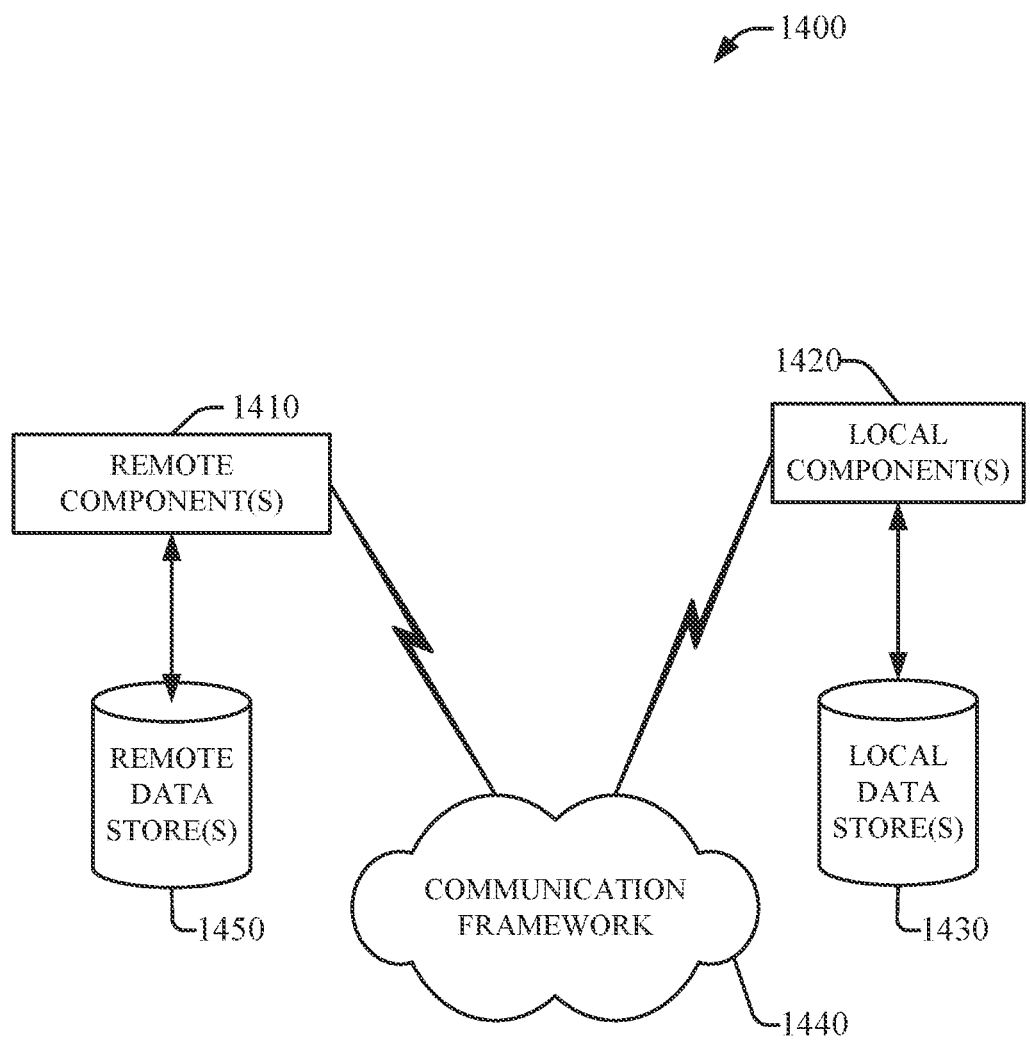
FIG. 14 is a block diagram representing an example computing environment into which aspects of the subject matter described herein may be incorporated.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
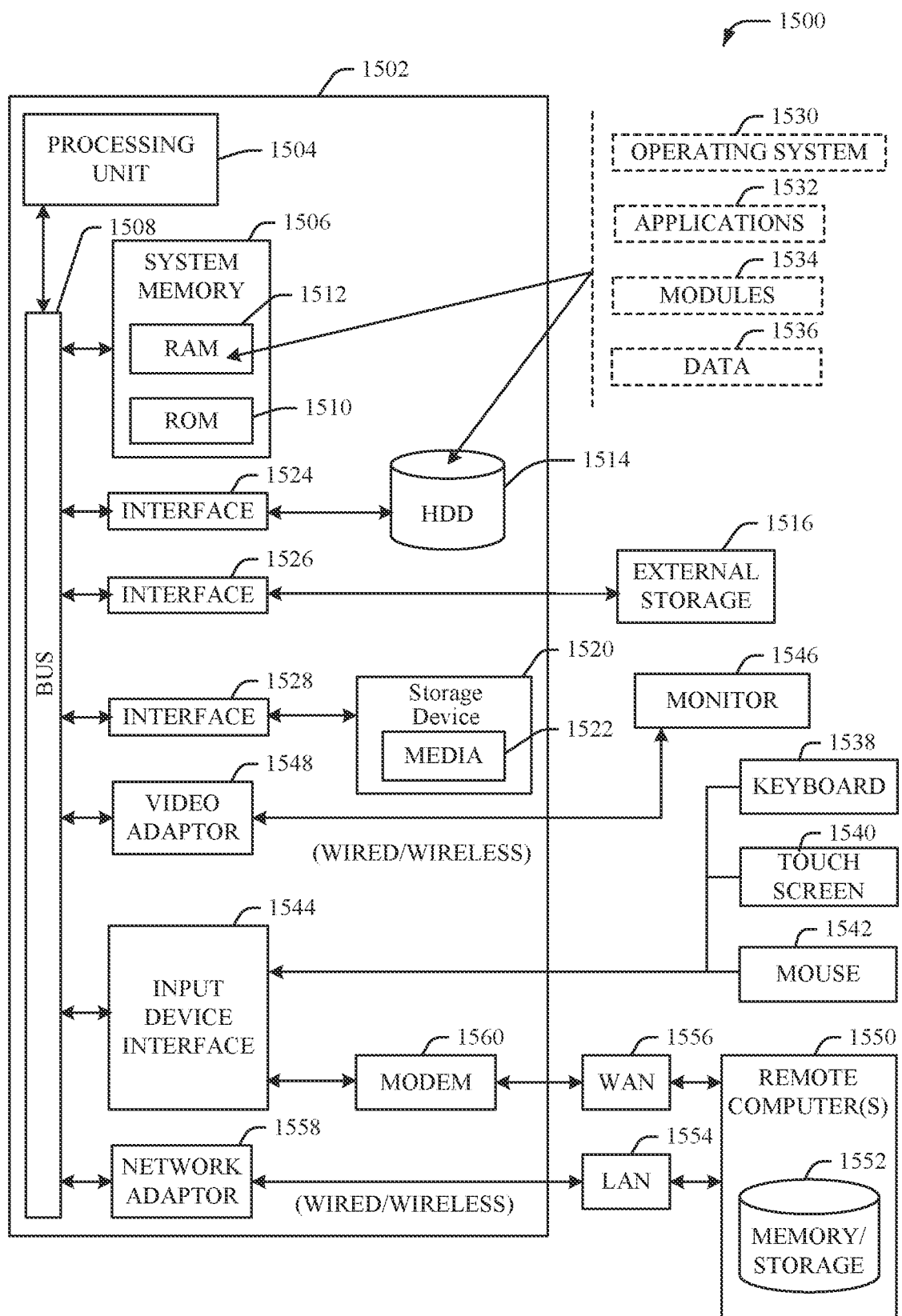
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
      creating a hard link in a first directory to a file object in a second directory, wherein the creating the hard link comprises:
         allocating a virtual inode number for the hard link in association with the first directory,
         generating a mapping between the virtual inode number and a first real inode number that identifies a real inode file of the file object, and
         associating a weight to the mapping;
      adding the weight to an existing total weight associated with mappings between virtual inode numbers and the first real inode number that identifies the real inode file of the file object to increase the existing total weight to an updated total weight associated with the real inode file of the file object;
      updating a hard link data store associated with the hard link to include an entry for the hard link to the file object, the entry comprising the first real inode number of the real inode file of the file object, a second real inode number of the first directory that identifies a directory real inode file of the first directory, a mapping real inode number of an inode mapping file associated with the first directory, and the virtual inode number of the hard link; and
      in response to receiving a request to write data via the hard link, determining whether the real inode file has been shared as a result of a snapshot, based on comparing the updated total weight associated with the real inode file of the file object to a total weight of the real inode file of the file object in an inode space of the hard link data store.

2. The system of claim 1, wherein the creating the hard link in the first directory comprises maintaining an identifier of the hard link and the virtual inode number of the hard link in a data block associated with the directory real inode file of the first directory.

3. The system of claim 1, wherein the operations further comprise maintaining an identifier of the hard link data store in association with the real inode file of the file object.

4. The system of claim 1, wherein the entry is a first entry, wherein the directory real inode file is a first directory real inode file, wherein the inode mapping file is a first inode mapping file, wherein the mapping real inode number is a first mapping real inode number, and wherein the operations further comprise updating the hard link data store associated with the file object to include a second entry for the file object, the second entry comprising the first real inode number of the first real inode file of the file object, a fourth real inode number of a second directory inode file of the second directory, a fifth real inode number of a second inode mapping file associated with the second directory, and the virtual inode number of the file object.

5. The system of claim 1, wherein the operations further comprise maintaining a link count representing a number of connections to the file object from a view by which the file object is accessible, the link count comprising one value for the hard link and one value for the second directory.

6. The system of claim 1, wherein the mapping the virtual inode number to the first real inode number that identifies the real inode file of the file object comprises maintaining the first real inode number that identifies the real inode file of the file object in a leaf indirect block associated with the directory real inode file of the first directory.

7. The system of claim 1, further comprising:
in response to updated total weight being determined to be equal to the total weight of the real inode file of the file object in the inode space, determining that the real inode file has been shared as a result of a snapshot, and
in response to the updated total weight being determined to be not equal to the total weight of the real inode file of the file object in the inode space, determining that the real inode file has not been shared as a result of a snapshot.

8. The system of claim 7, wherein the operations further comprise:
in response to determining that the real inode file has been shared as a result of a snapshot, allocating a fourth file real inode number of a new real inode file of the file object for the hard link, associating the virtual inode number of the hard link with the fourth file real inode number to disassociate the hard link from the real inode file of the file object, updating the hard link data store entries to include the fourth real inode number, copying the real inode file of the file object to the new file real inode for the hard link, reducing a first weight in the real inode file of the file object by a reduced amount, updating a second weight in the new real inode file for the hard link based on the reduced amount, and writing the data into the new real inode file.

9. The system of claim 7, wherein the operations further comprise, in response to determining that the real inode file has been shared as a result of a snapshot, writing the data into the real inode file.

10. A method, comprising:
creating, by a system comprising a processor, a hard link in a first directory to a file object in a second directory, wherein the creating the hard link comprises:
allocating a virtual inode number for the hard link in association with the first directory,
generating a mapping between the virtual inode number and a first real inode number that identifies a real inode file of the file object, and
associating a weight to the mapping;
adding, by the system, the weight to an existing total weight associated with mappings between virtual inode numbers and the first real inode number that identifies the real inode file of the file object to increase the existing total weight to an updated total weight associated with the real inode file of the file object;
updating, by the system, a hard link data store associated with the hard link to include an entry for the hard link to the file object, the entry comprising the first real inode number of the real inode file of the file object, a second real inode number of the first directory that identifies a directory real inode file of the first directory, a mapping real inode number of an inode mapping file associated with the first directory, and the virtual inode number of the hard link; and
in response to receiving a request to write data via the hard link, determining, by the system, whether the real inode file has been shared as a result of a snapshot, based on comparing the updated total weight associated with the real inode file of the file object to a total weight of the real inode file of the file object in an inode space of the hard link data store.

11. The method of claim 10, wherein the creating the hard link in the first directory comprises maintaining an identifier of the hard link and the virtual inode number of the hard link in a data block associated with the directory real inode file of the first directory.

12. The method of claim 10, further comprising maintaining, by the system, an identifier of the hard link data store in association with the real inode file of the file object.

13. The method of claim 10, wherein the entry is a first entry, wherein the directory real inode file is a first directory real inode file, wherein the inode mapping file is a first inode mapping file, wherein the mapping real inode number is a first mapping real inode number, and further comprising updating, by the system, the hard link data store associated with the file object to include a second entry for the file object, the second entry comprising the first real inode number of the first real inode file of the file object, a fourth real inode number of a second directory inode file of the second directory, a fifth real inode number of a second inode mapping file associated with the second directory, and the virtual inode number of the file object.

14. The method of claim 10, further comprising maintaining, by the system, a link count representing a number of connections to the file object from a view by which the file object is accessible, the link count comprising one value for the hard link and one value for the second directory.

15. The method of claim 10, further comprising:
in response to the updated total weight being determined to be equal to the total weight of the real inode file of the file object in the inode space, determining, by the system, that the real inode file has been shared as a result of a snapshot, and
in response to the updated total weight being determined to be not equal to the total weight of the real inode file of the file object in the inode space, determining, by the system, that the real inode file has not been shared as a result of a snapshot.

16. The method of claim 15, further comprising, in response to determining that the real inode file has been shared as a result of a snapshot, allocating, by the system, a fourth file real inode number of a new real inode file of the file object for the hard link, associating, by the system, the virtual inode number of the hard link with the fourth file real inode number to disassociate the hard link from the real inode file of the file object, updating, by the system, the hard link data store entries to include the fourth real inode number, copying, by the system, the real inode file of the file object to the new file real inode for the hard link, reducing, by the system, a first weight in the real inode file of the file object by a reduced amount, updating, by the system, a second weight in the new real inode file for the hard link based on the reduced amount, and writing, by the system, the data into the new real inode file.

17. The method of claim 15, further comprising, in response to determining that the real inode file has not been shared as a result of a snapshot, writing, by the system, the data into the real inode file.

18. A non-transitory machine-readable medium, comprising executable instructions that, when executed by a processor, facilitate performance of operations, the operations comprising:
    creating a hard link in a first directory to a file object in a second directory, wherein the creating the hard link comprises:
        allocating a virtual inode number for the hard link in association with the first directory,
        generating a mapping between the virtual inode number and a first real inode number that identifies a real inode file of the file object, and
        associating a weight to the mapping;
    adding the weight to an existing total weight associated with mappings between virtual inode numbers and the first real inode number that identifies the real inode file of the file object to increase the existing total weight to an updated total weight associated with the real inode file of the file object;
    updating a hard link data store associated with the hard link to include an entry for the hard link to the file object, the entry comprising the first real inode number of the real inode file of the file object, a second real inode number of the first directory that identifies a directory real inode file of the first directory, a mapping real inode number of an inode mapping file associated with the first directory, and the virtual inode number of the hard link; and
    in response to receiving a request to write data via the hard link, determining whether the real inode file is shared as a result of a snapshot, based on comparing the updated total weight associated with the real inode file of the file object to a total weight of the real inode file of the file object in an inode space of the hard link data store.

19. The non-transitory machine-readable medium of claim 18, wherein the operations further comprise:
    in response to the updated total weight being determined to be equal to the total weight of the real inode file of the file object in the inode space, determining that the real inode file is shared as a result of the snapshot, and
    in response to the updated total weight being determined to be not equal to the total weight of the real inode file of the file object in the inode space, determining that the real inode file is not shared as a result of the snapshot.

20. The non-transitory machine-readable medium of claim 19, wherein the operations further comprise:
    in response to determining that the real inode file is shared as a result of the snapshot, allocating a fourth file real inode number of a new real inode file of the file object for the hard link, associating the virtual inode number of the hard link with the fourth file real inode number to disassociate the hard link from the real inode file of the file object, updating the hard link data store entries to include the fourth real inode number, copying the real inode file of the file object to the new file real inode for the hard link, reducing a first weight in the real inode file of the file object by a reduced amount, updating a second weight in the new real inode file for the hard link based on the reduced amount, and writing the data into the new real inode file.

21. The non-transitory machine-readable medium of claim 19, wherein the operations further comprise:
    in response to determining that the real inode file is not shared as a result of the snapshot, writing the data into the real inode file.

* * * * *